United States Patent [19]

Hlavaty et al.

[11] Patent Number: 4,827,669
[45] Date of Patent: May 9, 1989

[54] GLASS STABILIZER FOR VEHICLE DOOR ASSEMBLY

[75] Inventors: David G. Hlavaty, Allen Park; Bohdan Kazewych, Rochester, both of Mich.

[73] Assignee: General Motors Corporation, Detroit, Mich.

[21] Appl. No.: 197,492

[22] Filed: May 23, 1988

[51] Int. Cl.4 ............................................. E05D 15/16
[52] U.S. Cl. ....................................... 49/436; 49/377; 49/441
[58] Field of Search ................. 49/436, 441, 376, 375, 49/377, 374, 502, 415, 416

[56] References Cited

U.S. PATENT DOCUMENTS

| | | | |
|---|---|---|---|
| 1,383,052 | 6/1921 | Allmand | 49/377 |
| 1,684,636 | 9/1928 | Mendenhall | 49/415 |
| 3,018,525 | 1/1962 | Deisenroth | 49/441 |
| 4,442,634 | 4/1984 | Kimura | 49/377 X |
| 4,658,546 | 4/1987 | Moriyama | 49/374 X |

Primary Examiner—Philip C. Kannan
Attorney, Agent, or Firm—William A. Schuetz

[57] ABSTRACT

A molded, one piece plastic glass stabilizer for capturing a side edge portion of a movable window in a frameless vehicle door when the window is lowered is disclosed. The stabilizer is supported in cantilever fashion and has a U-shaped portion defining a pair of spaced legs and a vertical through recess through which the glass passes. The legs include pairs of deflectable fingers having elliptically shaped free ends which are deflected by and engage the opposite sides of the glass with a minimum of friction while preventing rattling and vibration of the glass.

5 Claims, 1 Drawing Sheet

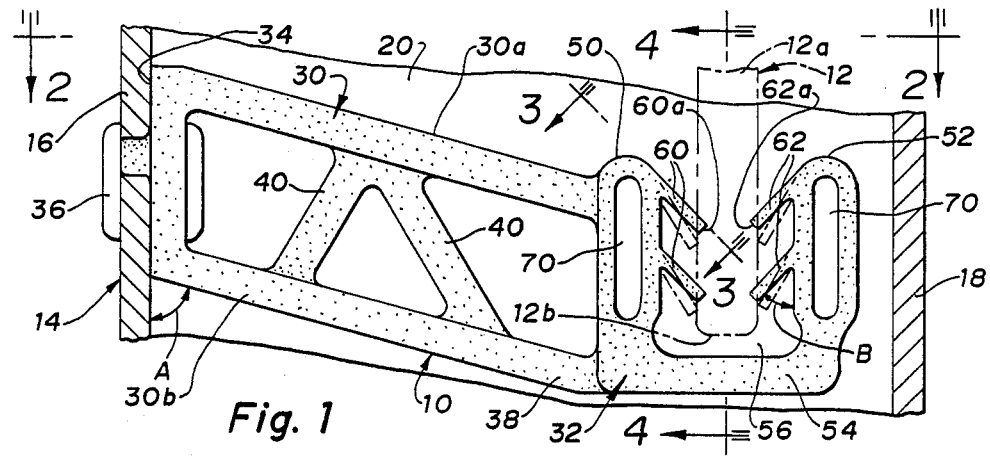
Fig. 1
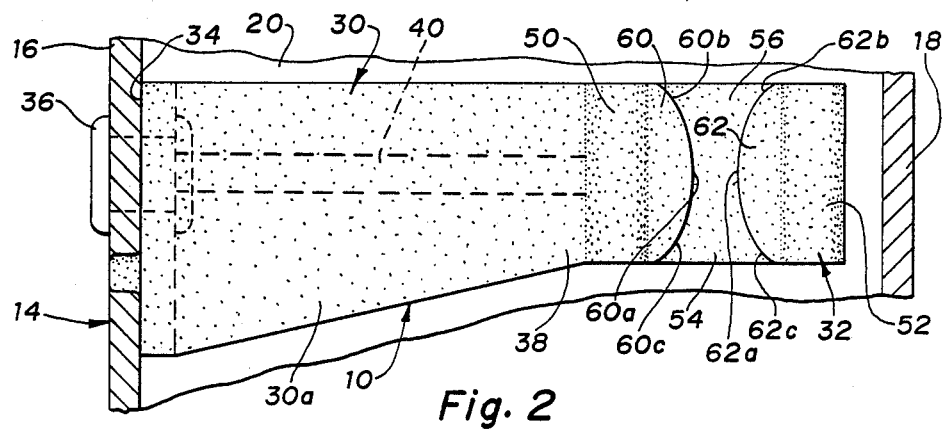
Fig. 2
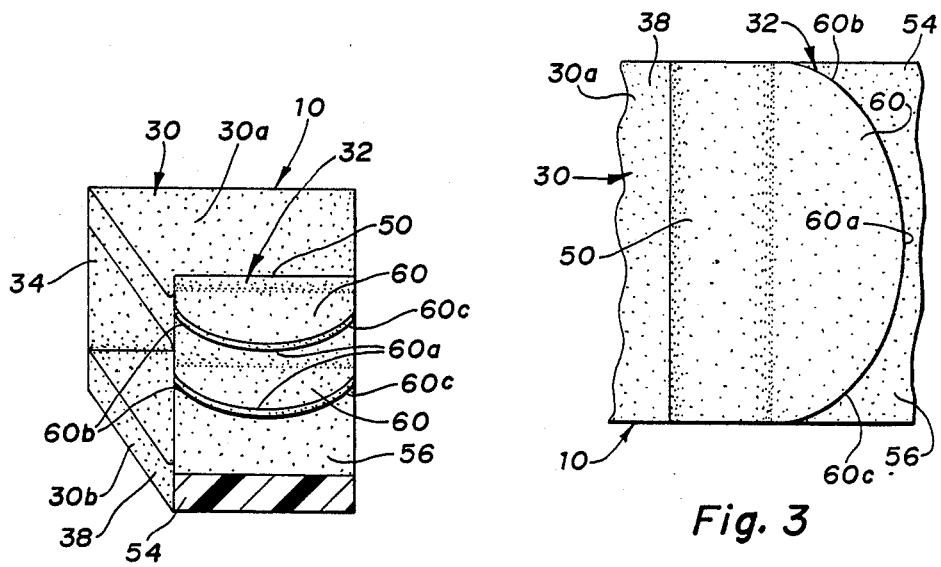
Fig. 4
Fig. 3

GLASS STABILIZER FOR VEHICLE DOOR ASSEMBLY

The present invention relates to a door assembly having a movable window glass and more particularly, to a glass stabilizer for a vehicle door assembly which functions, when the glass is moved toward an open position, to capture and retain an edge portion thereof with a minimum amount of friction while preventing rattling and vibration thereof.

It is common in vehicle door assemblies to provide glass run channels located inside the door for guiding the sides of a movable door window glass when the latter is lowered toward an open position to retain and position the window. In some door assemblies, however, such run channels are not utilized. In order to retain and stabilize the position of such windows to prevent rattling and vibration thereof when moved to an open position, some form of stabilizer is usually employed. Such prior stabilizers have included rollers, spring assemblies, etc. which are engageable with the window when the latter is lowered toward an open position. These type of stabilizers, however, sometimes engage the windows with a frictional force such that a good deal of effort or power is required to raise and lower the window.

The present invention provides a new and improved window engaging stabilizer for use with a vehicle door assembly which does not utilize glass run channels to guide the window to an open position. The stabilizer is molded in one piece and includes deflectable spaced apart fingers having rounded ends which function to guide the window therebetween as it is being lowered and which deflect and engage the opposite sides of the window with a minimum amount of friction and yet retain the window to prevent vibration and absorb shocks when the vehicle goes over rough road surfaces and/or the door is slammed. In addition, since friction between the stabilizer and glass is minimized, the window can be raised and lowered with less effort or force.

Accordingly, an important object of the present invention is to provide an new and improved glass stabilizer for a movable window of a vehicle door assembly and in which the stabilizer is of a one piece economical construction, can be readily attached to a panel of the door assembly and which is constructed and arranged such that it engages the window on opposite sides thereof with an minimum amount of friction and yet prevents rattling and absorbs any shock loads imposed thereon.

A further object of the present invention is to provide a new and improved window glass stabilizer, as defined in the next preceding object, and wherein the glass stabilizer comprises a substantially rigid body portion which is adapted to be connected to a panel of the door assembly and a U-shaped portion having a vertical recess therethrough for receiving a side edge portion of the glass, and in which opposed side legs of the U-shaped portion defining the recess each have a plurality of integral deflectable fingers which extend towards each other and are spaced from each other less than the width of the glass, and in which the deflectable fingers have rounded ends which define tapered entry surfaces for receiving and guiding entry of the side edge portion of the glass therebetween as it is being moved toward an open position and which are deflected as the window is being received therebetween to frictionally engage the opposite sides of the window with a minimum amount of frictional force, the construction of the deflectable fingers and opposite legs of the U-shaped portion being such that the window is captured and retained to prevent vibration and rattling thereof and yet be able to absorb any shock loads placed on the glass due to the vehicle going over rough road surfaces and/or the door assembly being slammed.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a fragmentary cross sectional view of a vehicle door assembly and showing a top plan view of the glass stabilizer;

FIG. 2 is a fragmentary sectional view looking in the direction of the arrows 2—2 of FIG. 1;

FIG. 3 is an enlarged fragmentary view looking in the direction of the arrows 3—3 of FIG. 1; and FIG. 4 is a cross sectional view looking in the direction of the arrows 4—4 of FIG. 1.

The present invention provides a novel glass stabilizer 10 for a movable, unframed glass window 12 in a vehicle door assembly 14. The vehicle door assembly 14 could be of any suitable or conventional construction and would preferably include an inner panel 16, an outer panel 18, a pair of end panels (not shown), a bottom (not shown) which together define a well 20 having an open top through which the window glass 12 would pass. The window glass 12 would be suitably supported by the door assembly 14 for movement between a closed position in which it would close an opening defined by the vehicle body and door assembly 14 and an open position in which the window glass 12 would be disposed within the well 20 of the door assembly 14. The window 12 would be moved between its position by a suitable or conventional window regulator mechanism carried by the door assembly 14. The door assembly 14 would also be of the type in which no side glass run channels located in the well 20 are provided for guiding and positioning the glass as it is being lowered towards its open position. Although only one glass stabilizer 10 is shown in FIG. 1 of the drawings, it should be understood that at least two horizontally spaced stabilizers located adjacent the lower end of the door assembly 14 for receiving opposite sides of the glass 12 would be employed.

The novel glass stabilizer 10 is carried by the door assembly 14 and functions to guide and retain the window glass 12 when it is lowered toward an open position so that rattling of the window 12 due to vibrations induced in the vehicle door by the vehicle going over rough road surfaces and so that any shock loads posed on the window 12 due to slamming of the door assembly 14 can be absorbed.

The glass stabilizer 10 is of a one piece, molded, semi-rigid plastic construction. The plastic material can be of any suitable or conventional copolymer material which is tough, but somewhat flexible, and which is chemically lubricated during the molding operations for applications involving low friction and long wear. The glass stabilizer 10 can also be made from a suitable or conventional thermoplastic polyester elastomer having a nominal 70–75 durometer which can withstand elevated temperatures without affecting its stiffness and strength and which can also withstand long term aging and optimum cold impact conditions. Such types of materials are well known to those skilled in the art and are commercially available.

The glass stabilizer 10 comprises a main body portion 30 and a U-shaped glass receiving portion 32. The main body portion 30 at one end 34 is suitably secured to the inner panel 16 via a suitable fastener means 36 and at its other end 38 is integral with the U-shaped portion 32. The body portion 30 is skewed and forms an acute included angle A with respect to the plane of the inner panel 16. The body portion is generally rectangular in shape and is hollow except that suitable cross bracess 40 are integrally molded between its upper and lower sides 30a and 30b, as viewed in FIG. 1. The main body portion 30 is semi or substantially rigid, but due to the fact that it is supported in cantilever fashion by the fastener 36 it is somewhat flexible in directions generally parallel to the plane of the inner panel 16.

The U-shaped portion 32 comprises a pair of spaced legs 50, 52 which are integrally connected by a bottom or bight 54. The leg 50 is integral with the main body portion 30. The U-shaped portion 32 has a through vertically extending recess or opening 56 through which a side edge portion 12a of the glass 12 can pass. The glass stabilizer 10 is positioned such that the bight 54 of the U-shaped portion 32 is spaced slightly from the side edge 12b of the glass 12.

Each of the legs 50, 52 have a plurality of spaced fingers 60, 62 formed integrally therewith. The fingers 60, 62 extend toward each other and extend toward the bight 54. The fingers 60, 62 form an acute, included angle B with respect to the inner side surface of the legs 50, 52. The fingers 60, 62 at their free ends 60a, 62a are arcuate in shape, preferably elliptical in shape, as best shown in FIGS. 2, 3 and 4. The adjacent arcuate ends 60a, 62a of the fingers 60, 62 carried by their respective legs 50, 52 together define tapered converging entry surfaces 60b and 62b therebetween through which the glass 12 can pass and tapered diverging exit surfaces 60c and 62c pass which the glass can exit. The elliptical free ends 60a and 62a of the fingers 60 and 62 at the midportions are spaced across from each other a distance less than the thickness of the glass 12, as best shown in FIG. 1.

When the window glass 12 is being lowered from its closed position toward an open position, the side edge portions 12a thereof, as they approach the glass stabilizers 10, will first engage the tapered entry surfaces 60b and 62b of the fingers 60 and 62 and begin to cause the fingers 60 and 62 to be deflected away from each other. As the glass 12 moves further downward, the midportions 60a and 62a of the fingers 60 and 62 will engage the opposite sides of the glass 12 to be further deflected from the solid line position shown in FIG. 1 toward the phantom line position shown in FIG. 1. Since the deflectable fingers 60, 62 are elliptically shaped at their free ends, these fingers will engage the glass 12 only along the minimum amount of surface contact so as to minimize friction therebetween yet, the respective fingers 60, 62 which engage both sides of the glass 12 will cause the glass to be retained and stabilized within the stabilizer 10. To increase the flexibility of the legs 50, 52 of the U-shaped portion 32, the U-shaped legs 50, 52 are preferably made hollow, as indicated by reference numeral 70. By making the legs 50, 52 hollow, the side wall thereof to which the fingers are integrally formed can be more readily deflected in response to the window pushing and deflecting the fingers 60, 62.

In addition, it should be noted that if the glass stabilizer is made from a suitable copolymer plastic material having self lubricating properties, friction can even be further minimized between the fingers 60, 62 and the glass 12.

From the foregoing, it should be apparent that the novel glass stabilizer of the present invention comprises a one piece construction which is economical to make, which captures and guides the glass to retain the same as it is moved toward an open position with a minimum amount of friction and yet, due to the multiple contacts of the fingers with the glass, provide good shock absorbing qualities for the stabilizer. The glass stabilizer functions to prevent rattling and vibration of the window 12 due to rough road surface conditions being encountered by the vehicle and also provides good shock absorbing quality capabilities should be vehicle door be slammed.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In a vehicle door assembly having spaced inner and outer panels, a generally vertically movable window supported by the door for movement between an open position in which it is disposed between the inner and outer panels and a closed position, and a window glass stabilizer carried by one of the inner and outer panels of said door assembly for engaging a side edge portion of said window to stabilize the same as the window is moved toward an open position, the improvement being that said stabilizer is made from a semi-rigid, self-lubricating, one piece molded plastic material comprising a main body portion extending transversely of said door assembly and secured to said one body panel thereof at one end thereof and at its other end integral with a U-shaped portion for receiving an edge portion of said window glass, said U-shaped portion having a pair of spaced legs and an intermediate bight, said legs and bight of said U-shaped portion defining a through recess extending in the direction of the edge portion of said window glass and with the legs being spaced from the pane of the glass when the latter is received in said recess, a plurality of spaced flexible fingers integral with said legs and extending toward said bight and forming an acute included angle with said legs, said fingers on opposite legs extending towards each other and having their free ends engageable by and deflected toward their adjacent legs by said edge portions of said glass as the glass is moved towards its open position to stabilize and retain the glass in its open position, said fingers at their free ends having tapered entry surfaces for guiding the edge of the glass between the fingers as the glass is being moved towards an open position and midportions defining rounded intermediate surfaces to minimize frictional contact with the glass.

2. In a vehicle door, as defined in claim 1, and wherein said legs are hollow to increase their flexibility.

3. In a vehicle door, as defined in claim 1, and wherein said fingers at their free ends are elliptical in shape.

4. A window glass stabilizer which is adapted to be secured to a panel of a vehicle door and which captures and guides a side edge portion of a window supported by a door for movement between open and closed positions as the window is being moved toward its open position in order to stabilize and prevent rattling thereof, said stabilizer being made from a semi-rigid, self-lubricating, one piece, molded plastic material and comprising a body portion extending transversely of said door and having one end rigidly secured to a body panel thereof and its other end integral with a U-shaped portion for receiving an edge portion of said glass, said U-shaped portion having a pair of spaced legs and having an intermediate bight, said legs and bight of said U-shaped portion defining a through recess extending in the direction of the edge portion of said glass and with the legs thereof being spaced from the pane of the glass when the latter is received in said recess, a plurality of spaced flexible fingers integral with said legs and extending toward said bight and forming an acute included angle with said legs, said fingers on opposite legs extending towards each other and having their free ends engageable and deflectable toward their respective adjacent legs by said edge portions of said glass as the glass is moved towards its open position to stabilize and retain the glass in its open position, said fingers at their free ends being arcuate in shape to define rounded tapered entry surfaces for guiding the edge portion of the glass between the fingers as the glass is being moved toward an open position and to define rounded intermediate surfaces to minimize frictional contact with the glass.

5. A window glass stabilizer, as defined in claim 4, and wherein said fingers at their free ends are elliptical in shape.

* * * * *